April 14, 1931.　　　H. C. GUSTAFSON　　　1,800,344
AUGER DRILL
Filed March 14, 1927　　　2 Sheets-Sheet 2
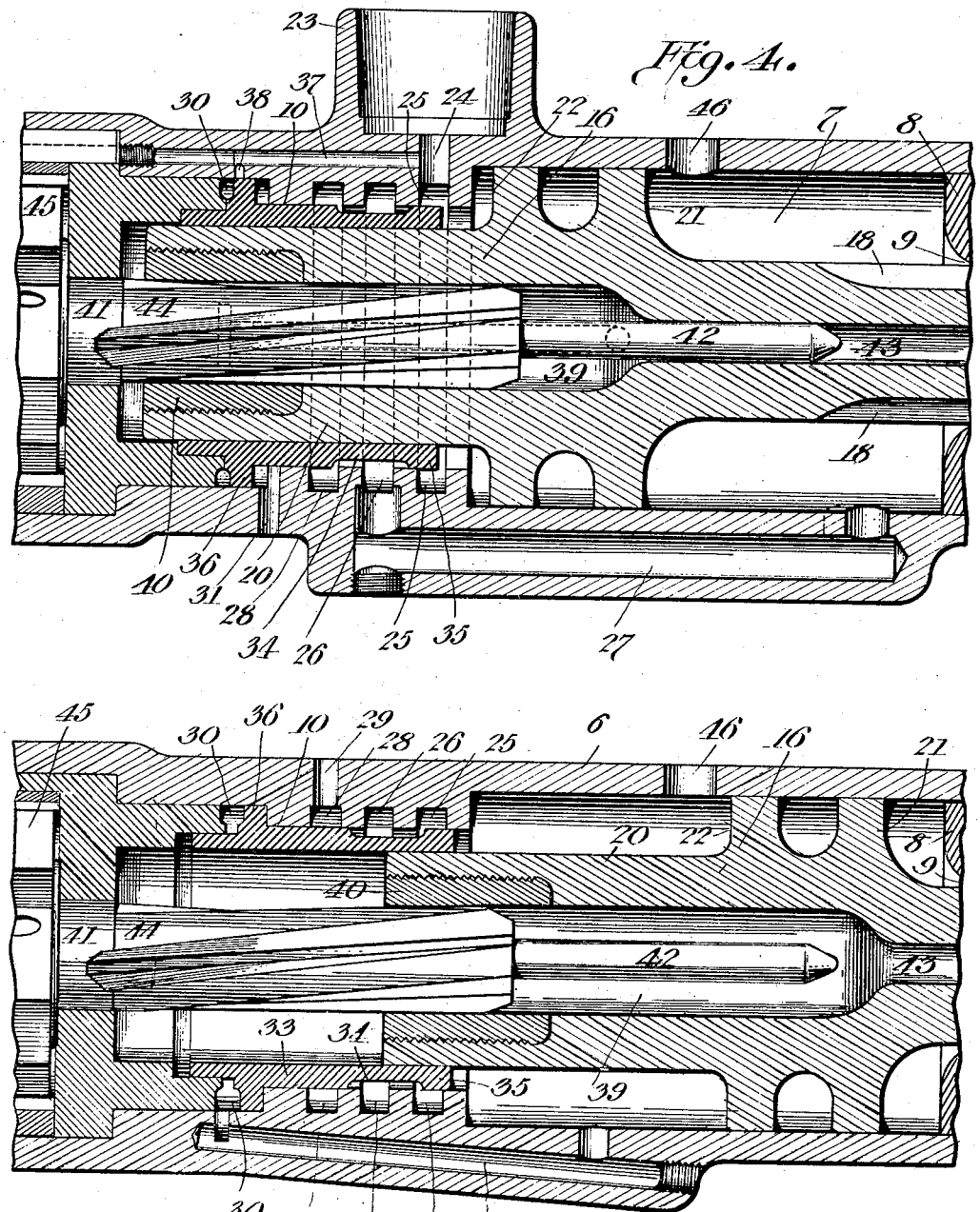

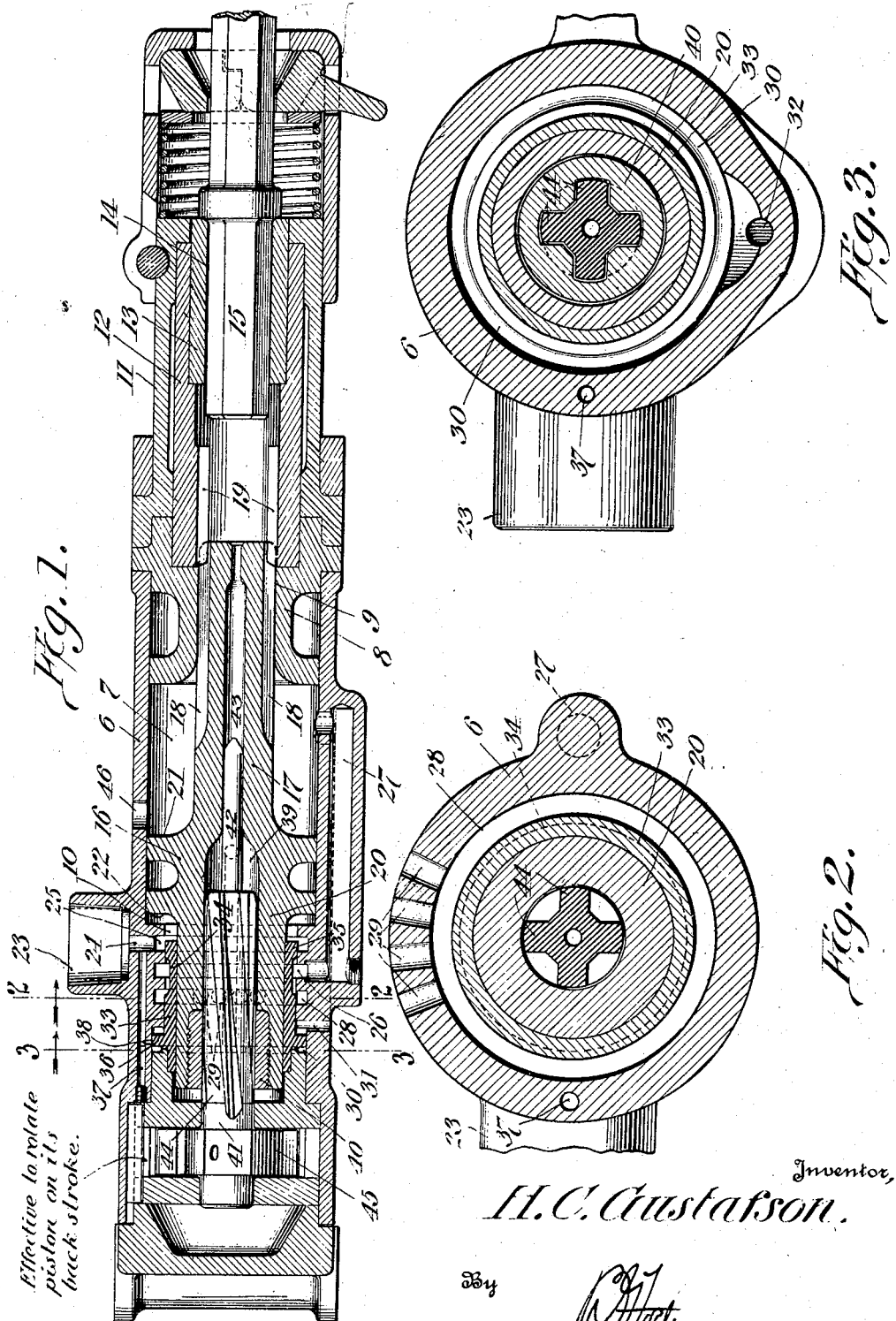

Patented Apr. 14, 1931

1,800,344

UNITED STATES PATENT OFFICE

HJALMER C. GUSTAFSON, OF DENVER, COLORADO, ASSIGNOR, BY MESNE ASSIGNMENTS, TO THE GARDNER-DENVER COMPANY, OF QUINCY, ILLINOIS, A CORPORATION OF DELAWARE

AUGER DRILL

Application filed March 14, 1927. Serial No. 175,320.

The present invention relates more particularly to the type of drilling apparatus used in soft material, such as iron ore. Ordinarily an auger drill is used, and it has been found desirable to have a high rotating torque in speed and a relatively light hammer blow.

The object of the present invention is to provide apparatus in which steel is rotated on the back stroke of the piston with ample turning torque and yet a light hammer blow on the drill steel is effected.

One embodiment of the invention is disclosed in the accompanying drawings, wherein:—

Figure 1 is a longitudinal sectional view.

Figures 2 and 3 are cross sectional views on the lines 2—2 and 3—3 of Figure 1,

Figure 4 is a sectional view on an enlarged scale of the rear portion of the tool with the piston hammer at the rear end of its stroke, Figure 5 is a view similar to Figure 4, but showing the piston hammer at the front end of its stroke.

In the embodiment disclosed, a cylinder member is employed, including a barrel 6, forming a piston head chamber 7. In the front end of the barrel is fitted a head member 8 having a bore 9 that opens into the head chamber 7, and constitutes a front piston extension chamber. The rear portion of the barrel has a reduced internal diameter, forming a rear piston extension chamber 10.

Mounted on the front end of the cylinder member is a chuck housing 11, in which is located a chuck sleeve 12. This chuck sleeve is provided with a bushing 13 having a socket 14 that is angular in cross section to receive the correspondingly formed end 15 of an auger drill steel.

Located in the cylinder member is a piston which includes a body 16 that operates in the head chamber 7 and a reduced forwardly projecting hammer extension 17 that operates in the forward piston extension chamber 9, and is adapted to strike the rear end 15 of the auger drill steel. This piston extension 17 is provided with suitable flutes 18 that slidably interlock with flutes 19 formed within the sleeve 12. Obviously therefore the piston hammer, the chuck sleeve and the steel 15 will rotate together.

Projecting from the piston body 16 is a rearward extension 20 operating in the rear extension chamber 10, of less diameter than said body 16, but of greater diameter than the forward extension 17. As a consequence it will be noted that the front face 21 of the body 16 is of materially greater area than the rear face 22 of said body. This is of importance for the reasons hereinafter given.

Formed upon the side of the barrel 6 is a nipple 23, through which motive fluid is supplied to the tool. This nipple has a communication through a port 24 with an annular groove 25 formed in the wall of the extension chamber 10 adjacent to the front end. Another annular groove 26, formed behind the groove 25 has communication through a passageway 27 with the front end of the piston body chamber 7 in advance of the piston body 16. A third groove 28 is formed behind the groove 26, and communicating therewith are exhaust ports 29 opening preferably to atmosphere. At the rear end of the chamber 10 a fourth groove 30 is formed. The front end of this groove is open to atmosphere through a vent port 31 (see Figures 1 and 4) and the rear end of said groove 30 has communication through a passageway 32 with the head chamber 7 a short distance in advance of the rear end thereof, as shown in Figure 5. Located in the rear extension chamber 10 and interposed between the rear piston extension 20 and the barrel 6 is a tubular automatic distributing valve 33 having a sliding fit with the internal surface of the wall of the extension chamber 10, and with the extension 20 of the piston. It will be noted by reference to Figure 5 that the extension 20 remains in the valve when in its foremost position. The valve 33 is provided at its front end with an annular groove 34, forming a front head 35, the groove serving to afford communication between the two grooves 26 and 28 when the valve is in its rearmost position, as shown in Figure 4, and affording communication between the grooves 26 and 25 when the valve is in its foremost position, as shown in Figure 5. The rear end portion of the valve 33 furthermore has an annular outstanding flange 36 that is slidably located in the rearmost groove 30. By reference to Figures 1 and 4, it will be noted that a small passageway 37 leads from the supply port 24 and opens through a port 38 into the central portion of the rear groove 30. This port is adapted to be covered and uncovered by the flange 36.

The piston body 16 and rear extension 20 are provided with a central bore 39 opening through the rear end of the extension 20. Fitted in the rear end of the extension 20 is a rifle nut 40 that is engaged by a rifle bar 41 that is received in the bore 39. This rifle bar has a forwardly extending pin 42 that constitutes a plug which engages in and disengages from a bore 43 constituting a port formed in the front hammer extension 17, and opening through its front end. The rifle bar 41 has threads or flutes 44 of relatively steep pitch and this rifle bar is carried by suitable ratchet mechanism 45 so faced and operating that it will be held against movement on the rearward stroke of the piston, and will be free to rotate on the forward stroke of the piston. As a consequence it will be evident that the piston on its forward stroke will deliver a blow against the drill steel, but will not be rotated, while on the rearward stroke the piston will be caused to rotate, thereby rotating the chuck sleeve and the drill steel.

The operation of the tool may be outlined as follows. With the parts as shown in Figures 1 and 4, the valve is in its rearmost position. Motive fluid supplied through the port 24 will pass through the front end of the rear extension chamber 10 and operating against the rear face 22 of the piston body will drive the piston forwardly. The area of the face 22 is, however, relatively small, so that the force of the blow delivered by the piston against the drill steel will be correspondingly light. As the piston body 16 moves forwardly, it will uncover the front end of the passageway 32. Consequently motive fluid behind the piston body will traverse the passageway 32, and operating against the rear end of the flange 36 of the valve, move said valve forwardly, or to the position shown in Figure 5. When this change takes place, motive fluid will be cut off from behind the piston body 16, but it can now flow by way of the groove 25, groove 34, groove 26 and passageway 27 to the front end of the piston chamber 7 and consequently against the front face 21 of the piston body. The area of this face 21 is materially greater than the area 22. Therefore the piston will be driven rearwardly with greater force than the front stroke. In this rearward movement, as above explained, the piston is given a partial turning movement by the rifle bar. This movement is, however, relatively great because of the steep pitch of the threads or flutes 44. The consequence is that the chuck sleeve 12 and steel 15 are given a relatively great turning movement, so that the turning action of the auger steel is very effective. As shown, exhaust takes place partly through the usual outlet 46 opening from the piston head chamber 7 between its ends and traversed by the piston body. In addition the groove 28 also constitutes an exhaust-permitting means because of the outlet ports 29, this groove as shown in Figures 1 and 4 being in communication with the front end of the piston chamber 7 during the forward movement of the piston. The forward shifting movement of the valve as already explained is due to motive fluid traversing the passageway 32 when uncovered by the forward movement of the piston body. The rearward movement of this valve is effected by compression of the motive fluid in the rear end of the piston chamber 7 operating against the front end or head 35 of the valve as the piston approaches the limit of its rearward stroke.

When the piston 16 is in its forward position as shown in Figure 5, the pin 42 is out of the bore 43 and therefore the fluid behind the rear extension 20 can escape through the port 43 as the piston moves rearwardly. But before the piston reaches the rear end of its stroke the plug 42 has entered the bore and this escape is substantially restricted, if not completely stopped. However, as the area of the rear face of the extension 20 is less than the front pressure face 21, the pressure that begins to build up against said rear face is not sufficient to prevent the full rear stroke of the piston by the pressure acting against the front face 21. When the full stroke is completed, however, the return stroke is initiated by the pressure against the rear face 22 plus the built up pressure against the rear extension and these together quickly overcome the inertia of the piston to start it on its forward stroke, the assisting action being quickly eliminated however.

This structure, it will be noted provides means therefore by which relatively light hammer blows are delivered to the drill steel and between those blows an effective and powerful torque is secured for rotating the auger drill.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:

1. In drilling apparatus, the combination with a cylinder member having a piston body chamber with a rear extension chamber of less diameter than the body chamber, of a piston having a body in the body chamber provided with front and rear pressure faces and a rear extension in the rear extension chamber, movable means independent of said rear chamber for directing motive fluid alternately against the front and rear pressure surfaces of the body to reciprocate the piston, means for permitting the escape of fluid from the rear end of the rear extension chamber on the rearward movement of the piston, and means for cutting off said escape prior to the piston reaching the rear end of its stroke.

2. In drilling apparatus, the combination with a cylinder member having a piston body chamber with a rear extension chamber of less diameter than the body chamber, of a piston having a body in the body chamber provided with front and rear pressure faces and a rear extension in the rear extension chamber, movable means independent of said rear chamber for directing motive fluid alternately against the front and rear pressure surfaces of the body to reciprocate the piston, a passageway through the piston for permitting the escape of fluid from the rear end of the rear extension chamber on the rearward movement of the piston, and a plug that enters the passageway for cutting off said escape prior to the piston reaching the rear end of its stroke.

3. In drilling apparatus, the combination with a cylinder member having a piston body chamber with front and rear extension chambers of less diameter than the body chamber, the front chamber being of less diameter than the rear chamber, of a piston body in the body chamber having front and rear extensions of different diameters in the extension chambers, movable means independent of said rear chamber for supplying fluid alternately to the front and rear faces of the piston body, the front face of the body being of greater area than the rear face, means for permitting the escape of fluid behind the rear extension when the piston initially moves rearwardly, means for cutting off said escape prior to the completion of the rear stroke of the piston, to cause pressure to build up in the rear extension chamber and assist the pressure against the rear face of the body to start the piston on its forward stroke.

4. In drilling apparatus, the combination with a cylinder member having a piston body chamber with front and rear extension chambers of less diameter than the body chamber, the front chamber being of less diameter than the rear chamber, of a piston body in the body chamber having front and rear extensions of different diameters in the extension chambers, movable means independent of said rear chamber for supplying fluid alternately to the front and rear faces of the piston body, the front face of the body being of greater area than the rear face, a passageway through the piston for permitting the escape of fluid behind the rear extension when the piston initially moves rearwardly, and a plug that enters the passageway for cutting off said escape prior to the completion of the rear stroke of the piston, to cause pressure to build up in the rear extension chamber and assist the pressure against the rear face of the body to start the piston on its forward stroke.

In testimony whereof, I affix my signature.

HJALMER C. GUSTAFSON.